US011260889B2

(12) United States Patent
Liao (10) Patent No.: US 11,260,889 B2
(45) Date of Patent: Mar. 1, 2022

(54) CART AND WHEEL CONNECTING STRUCTURE

(71) Applicant: UNIQUE PRODUCT & DESIGN CO., LTD., Tainan (CN)

(72) Inventor: Tsoung-Yong Liao, Tainan (CN)

(73) Assignee: UNIQUE PRODUCT & DESIGN CO., LTD., Tainan (CN)

( * ) Notice: Subject to any disclaimer, the term of this patent is extended or adjusted under 35 U.S.C. 154(b) by 64 days.

(21) Appl. No.: 16/632,325

(22) PCT Filed: Oct. 5, 2017

(86) PCT No.: PCT/EP2017/075331
§ 371 (c)(1),
(2) Date: Jan. 17, 2020

(87) PCT Pub. No.: WO2019/015791
PCT Pub. Date: Jan. 24, 2019

(65) Prior Publication Data
US 2020/0164907 A1 May 28, 2020

(30) Foreign Application Priority Data

Jul. 21, 2017 (CN) .......................... 201720890425.3

(51) Int. Cl.
*B62B 3/02* (2006.01)
*B62B 5/00* (2006.01)
(Continued)

(52) U.S. Cl.
CPC ................. *B62B 3/02* (2013.01); *B62B 5/00* (2013.01); *B62B 7/06* (2013.01); *B62B 9/00* (2013.01); *B62B 2205/12* (2013.01)

(58) Field of Classification Search
CPC .... B62B 3/02; B62B 3/12; B62B 5/00; B62B 7/06; B62B 9/00
See application file for complete search history.

(56) References Cited

U.S. PATENT DOCUMENTS

2010/0059948 A1* 3/2010 Liao .......................... B62B 3/02
280/42
2011/0241314 A1 10/2011 Liao

FOREIGN PATENT DOCUMENTS

CN 202186404 U 4/2012
CN 202654637 U 1/2013
(Continued)

*Primary Examiner* — James A Shriver, II
*Assistant Examiner* — James J Triggs
(74) *Attorney, Agent, or Firm* — Muncy, Geissler, Olds & Lowe, P.C.

(57) ABSTRACT

A cart comprises a body structure and at least one wheel connecting structure. The body structure comprises a support shaft, a first frame member and a second frame member. Both the first and second frame members are disposed on the support shaft. The wheel connecting structure is disposed on one end of the support shaft and comprises a driving assembly, a rotating assembly, a linking assembly, and an energy assembly. The driving assembly is connected to the first frame member. One end of the rotating assembly is disposed in correspondence with the one end of the support shaft, and the other end of the rotating assembly is mounted on a wheel member. The linking assembly is disposed between the driving assembly and the rotating assembly. The linking assembly comprises a pushing unit, which is pivotally connected to the rotating assembly. The energy assembly is connected to the linking assembly.

19 Claims, 10 Drawing Sheets

(51) Int. Cl.
*B62B 7/06* (2006.01)
*B62B 9/00* (2006.01)

(56) References Cited

FOREIGN PATENT DOCUMENTS

| | | |
|---|---|---|
| CN | 204337672 U | 5/2015 |
| CN | 205256377 U | 5/2016 |
| DE | 20 2012 101 886 U1 | 7/2012 |
| GB | 2493805 A | 2/2013 |
| TW | M355866 U | 5/2009 |

* cited by examiner

CART AND WHEEL CONNECTING STRUCTURE

BACKGROUND OF THE INVENTION

Field of Invention

The disclosure relates to a cart and a wheel connecting structure, and more particularly to a cart having wheels that can be flattened and retracted, and a wheel connecting structure applied to a junction between a vehicle and a wheel thereof, and capable of flattening and retracting the wheel of the vehicle.

Related Art

When people are handling various kinds of goods, various sizes of carts for handling various kinds of goods are frequently used in order to achieve the timesaving and laborsaving effects. The cart mainly has tires disposed on a bottom of a vehicle body, and a handle disposed on the vehicle body and to be pulled or pushed by the user. Because the cart can carry a lot of goods at a time, it is unnecessary for two hands of the people to handle the goods slowly one by one. In addition, the movement caused by the tires of the cart provides the more laborsaving, timesaving and convenient ways than the manpower for handling the goods, so that the carts are widely used by people.

Although the above-mentioned cart can achieve the effects of carrying and handling the objects, it only has one single function of handling objects, and the wheels cannot be retracted, so that the cart occupies too much space, and the overall structure design still needs to be improved.

In summary, the inventor had thought of and designed a cart and a wheel connecting structure for improving the drawbacks of the prior art and thus enhancing the industrial implementation and utilization.

SUMMARY OF THE INVENTION

In view of the problems of the above-described known art, an objective of the disclosure is to provide a cart and a wheel connecting structure to solve the drawbacks of the known art.

In view of the foregoing objectives, the disclosure provides a cart comprising a body structure and at least one wheel connecting structure. The body structure comprises a support shaft, a first frame member and a second frame member. The first frame member and the second frame member are disposed on the support shaft. Optionally, the second frame member is disposed adjacent to the first frame member and is fixed to the support shaft. The at least one wheel connecting structure is disposed on one end of the support shaft and comprises a driving assembly, a rotating assembly, a linking assembly, and an energy assembly. The driving assembly is fitted with the support shaft and connected to the first frame member. One end of the rotating assembly is disposed in correspondence with the one end of the support shaft, and the other end of the rotating assembly is mounted on a wheel member. The linking assembly is fitted with the support shaft, and disposed between the driving assembly and the one end of the rotating assembly. The linking assembly comprises a pushing unit, and one end of the pushing unit is pivotally connected to the rotating assembly. The energy assembly is disposed in the support shaft and connected to the linking assembly.

Furthermore, the disclosure provides a cart comprising:
a body structure comprising a support shaft, a first frame member and a second frame member, wherein the first frame member is disposed on the support shaft; and
at least one wheel connecting structure, which comprises:
a driving assembly;
a rotating (pivoting) assembly, wherein one end of the rotating assembly is connected to the support shaft, and the other end of the rotating assembly is mounted on a wheel member, wherein the one end of the rotating assembly and the other end of the rotating assembly are pivotably connected to one another;
a linking assembly fitted with the support shaft, and disposed between the driving assembly and the one end of the rotating assembly, wherein the linking assembly comprises a pushing unit, and one end of the pushing unit is connected to the rotating assembly; and
an energy assembly disposed in the support shaft and connected to the linking assembly.

Optionally, when the first frame member is driven and links with the driving assembly to move the linking assembly to approach the rotating assembly, the linking assembly moves the rotating assembly to be deployed through the pushing unit, so that the wheel member is deployed in a standing state, and pushes the energy assembly to make the energy assembly enter an energy storing state.

Optionally, when the first frame member is driven to disengage the driving assembly from the linking assembly or link with the driving assembly away from the linking assembly, and the wheel member does not contact a ground, the energy assembly is in an energy releasing state to push the linking assembly toward the driving assembly, os that the linking assembly drives the rotating assembly to be retracted through the pushing unit to make the wheel member enter a flattened state.

Optionally, the rotating assembly further comprises a fixing unit and a movable unit. The fixing unit disposed in correspondence with the one end of the support shaft, wherein the linking assembly is disposed between the driving assembly and the fixing unit; and one end of the movable unit is connected to the fixing unit, the other end of the movable unit is connected to the wheel member, wherein the one end of the pushing unit is pivotally connected to the movable unit.

Optionally, when the wheel member is deployed in the standing state, a predetermined included angle is formed between the wheel member and the support shaft, and the predetermined included angle ranges from 85 to 95 degrees.

Optionally, the linking assembly comprises a hollow structure, an inner wall of the linking assembly comprises at least one projecting portion, and the at least one projecting portion snaps in a sliding slot of the support shaft.

Optionally, one end of the driving assembly comprises at least one pushing portion, one end of the linking assembly corresponding to the at least one pushing portion comprises a resisting portion, and when the driving assembly pushes the resisting portion by means of the at least one pushing portion to move the linking assembly toward the rotating assembly, the linking assembly moves in the sliding slot through the at least one projecting portion.

Optionally, when the driving assembly is driven to move the linking assembly to approach the rotating assembly, the linking assembly moves the rotating assembly to be deployed through the pushing unit, so that the wheel member is in a deployed in the standing state, and links with the energy assembly to stretch.

Optionally, when the energy assembly winds through a self-retraction force, the energy assembly moves the linking assembly toward the driving assembly, so that the linking assembly drives the rotating assembly to be retracted through the pushing unit to make the wheel member enter a flattened state.

Optionally, the rotating assembly further comprises a fixing unit and a movable unit. The fixing unit disposed in correspondence with the one end of the support shaft, wherein the linking assembly is disposed between the driving assembly and the fixing unit; and one end of the movable unit is connected to the fixing unit, and the other end of the movable unit is connected to the wheel member, wherein the one end of the pushing unit is pivotally connected to the movable unit.

Optionally, when the driving assembly is driven to move the linking assembly to approach the fixing unit, the linking assembly rotates the movable unit in a first direction through the pushing unit, so that the rotating assembly is deployed.

Optionally, when the energy assembly moves the linking assembly toward the driving assembly, the linking assembly rotates the movable unit in a second direction through the pushing unit, so that the rotating assembly is retracted.

Optionally, when the wheel member is in the deployed in the standing state, a predetermined angle is formed between the wheel member and the support shaft, and the predetermined angle ranges from 85 to 95 degrees.

In view of the foregoing objectives, the disclosure further provides a wheel connecting structure. The wheel connecting structure comprises a driving assembly, a rotating assembly, a linking assembly and an energy assembly. The driving assembly is fitted with a support shaft of a vehicle. One end of the rotating assembly disposed in correspondence with one end of the support shaft, and the other end of the rotating assembly is mounted on a wheel member. The one end of the rotating assembly and the other end of the rotating assembly are pivotally connected to one another. The linking assembly is fitted with the support shaft, and disposed between the driving assembly and the one end of the rotating assembly. The linking assembly comprises a pushing unit, and one end of the pushing unit is pivotally connected to the rotating assembly. The energy assembly is disposed in the support shaft and connected to the linking assembly.

As mentioned hereinabove, the provisions of the driving assembly, the rotating assembly, the linking assembly and the energy assembly on the shaft or axle in the cart and the wheel connecting structure of the disclosure can provide the user the functions of pushing and deploying the rotating assembly after enabling the driving assembly, and making the wheel member enter the standing state to achieve the effect of deploying the wheel by driving the linking assembly. While the linking assembly pushes the rotating assembly, the linking assembly also pushes the energy assembly, so that the energy assembly enters the energy storing state. Thus, when the linking assembly stops pushing the energy assembly, the energy assembly enters the energy releasing state, and pushes the linking assembly to move, so that the linking assembly drives the rotating assembly to retract, and the wheel member enters the flattened state to achieve the storage effect. Accordingly, the convenience in using and storing the cart can be enhanced.

In another implementation aspect, while the linking assembly pushes the rotating assembly, the linking assembly may also link with the energy assembly to stretch the energy assembly. Thus, when the linking assembly stops linking with the energy assembly and is not restricted by the external force, the energy assembly winds through the self-retraction force, and links with the linking assembly to move together, so that the linking assembly drives the rotating assembly to retract, the wheel member enters the flattened state, and the storage effect can be similarly achieved.

REFERENCE NUMERALS

1: cart; 10: body structure; 100: support shaft; 100a: sliding slot; 101: first frame member; 102: second frame member; 103: wheel member; 11: wheel connecting structure; 110: driving assembly; 1100: pushing portion; 111: rotating assembly; 1111: fixing unit; 1112: movable unit; 1113: salient; 112: linking assembly; 1120: pushing unit; 1121: projecting portion; 1122: resisting portion; 113: energy assembly; 2: vehicle; 20: support shaft; A: predetermined included angle; F1: first direction; F2: second direction; F3: linear direction.

DETAILED DESCRIPTION OF THE INVENTION

In order to facilitate the understanding of the technical features, contents and advantages of the present disclosure and the achievable effects thereof, the present disclosure will now be described in detail with reference to the accompanying drawings. The accompanying drawings, which are used only in the schematic and auxiliary specification, are not necessarily intended to be the true ratio to the present disclosure and are not intended to be precisely arranged. Therefore, it to be described that the scope of the claims in the actual practice should not be limited by the proportions and configuration relationships of the attached drawings.

The embodiments of the disclosure will be apparent from the following detailed description, which proceeds with reference to the accompanying drawings, wherein the same references relate to the same elements.

Please refer to FIGS. 1 to 4, which are respectively the first to the fourth schematic structure views showing a cart according to a first embodiment of the disclosure. As shown in the drawings, a cart 1 comprising a body structure 10 and at least one wheel connecting structure 11. The body structure 10 comprises a support shaft 100, a first frame member 101 and a second frame member 102. The first frame member 101 is disposed on the support shaft 100, and the second frame member 102 is disposed adjacent to (or abuts upon) the first frame member 101 and is fixed to the support shaft 100. The at least one wheel connecting structure 11 is disposed on one end of the support shaft 100 and may comprise a driving assembly 110, a rotating assembly 111, a linking assembly 112, and an energy assembly 113. The driving assembly 110 is fitted with the support shaft 100 and connected to the first frame member 101. For example, the driving assembly 110 is telescoped with the support shaft 100. One end of the rotating assembly 111 is disposed in correspondence with the one end of the support shaft 100, and the other end of the rotating assembly 111 is mounted on a rotating wheel member 103. The linking assembly 112 is fitted (or telescoped) with the support shaft 100, and disposed between the driving assembly 110 and the one end of the rotating assembly 111. The linking assembly 112 comprises a pushing unit 1120, and one end of the pushing unit 1120 is pivotally connected to the rotating assembly 111. The energy assembly 113 is disposed in the support shaft 100 and connected to the linking assembly 112.

When the first frame member 101 is driven and links with the driving assembly 11 to move the linking assembly 112 to approach the rotating assembly 111, the linking assembly 112 moves the rotating assembly 111 to be deployed through the pushing unit 1120, so that the wheel member 103 is deployed in a standing state, and pushes the energy assembly 113 to make the energy assembly 113 enter an energy storing state. On the other hand, when the first frame member 101 is driven to link with the driving assembly 110 away from the linking assembly 112 and the wheel member 1063 does not contact a ground, the energy assembly 113 is in an energy releasing state to push the linking assembly 112 toward the driving assembly 110, so that the linking assembly 112 drives the rotating assembly 111 to be retracted through the pushing unit 1120 to make the wheel member 103 enter a flattened state.

Specifically speaking, the cart 1 of the disclosure has the function of making the wheel be automatically flattened and retracted, to provide the user the storage convenience. The cart 1 of the disclosure includes a body structure 10 and at least one wheel connecting structure 11. The body structure 10 may be that of a known cart, which includes, for example but without limitation to, a golf cart. The body structure 10 comprises a support shaft 100, a first frame member 101 and a second frame member 102. The first frame member 101 is disposed on the support shaft 100. The second frame member 102 is fixed onto the support shaft 100 and is disposed adjacent to (or abuts upon) the first frame member 101. There may be one or multiple first frame members 101 and one or multiple second frame members 102. The first frame member 101 and the second frame member 102 may directly abut upon each other or another or other elements may be further disposed therebetween. The at least one wheel connecting structure 11 is disposed on one end of the support shaft 100. There is, for example but without limitation to, one wheel connecting structure 11 in this embodiment. Upon actual implementation, one or multiple wheel connecting structures 11 may be provided according to the user's or manufacturer's requirements. At least one wheel connecting structure 11 comprises a driving assembly 110, a rotating assembly 111, a linking assembly 112, and an energy assembly 113. The driving assembly 110 and the linking assembly 112 may have hollow structures respectively fitted (or telescoped) with the support shaft 100 of the body structure 10 and neighboring upon each other. In addition, the driving assembly 110 is connected to the first frame member 101.

The driving assembly 110 and the first frame member 101 may be two independent members, or constitute an integral member. One end of a rotating assembly 111 may be disposed on one end of the support shaft 100, and the other end of the rotating assembly 111 comprises a wheel member 103. The linking assembly 112 is further connected to an energy assembly 113, which may be a spring, an oil cylinder or a constant force spring. The energy assembly 113 may be disposed between the linking assembly 112 and the driving assembly 110, or between the linking assembly 112 and the rotating assembly 111. In this example embodiment, the energy assembly 113 is disposed between the linking assembly 112 and the rotating assembly 111, but the disclosure is not restricted thereto. In addition, the linking assembly 112 further comprises a pushing unit 1120, wherein one end of the pushing unit 1120 is pivotally connected to one side of the rotating assembly 111.

Thus, when the user wants to put up the wheel member 103, it is possible to drive the first frame member 101 to indirectly drive the driving assembly 110 to move the linking assembly 112 to approach the rotating assembly 111. While the linking assembly 112 is operating, the linking assembly 112 may also drive the rotating assembly 111 to be deployed through the pushing unit 1120, so that the wheel member 103 enters a standing state (see FIG. 3), and the cart 1 can handle the article through the wheel member 103. In addition, when the driving assembly 110 drives the linking assembly 112 to move toward the rotating assembly 111, the linking assembly 112 pushes the energy assembly 113 to make the energy assembly 113 enter the energy storing state to store the energy. Because the friction is present when the wheel member 103 touches the ground or the object, the wheel member 103 can exert a pulling force to the linking assembly 112 through the rotating assembly 111, so that the linking assembly 112 continuously pushes the energy assembly 113.

When the user wants to store the cart 1, it is possible to firstly drive the first frame member 101 to link with the driving assembly 110, so that the driving assembly 110 moves away from the linking assembly 112 without pushing the linking assembly 112. Next, the wheel member 103 is suspended. While the friction between the wheel member 103 and the ground or the object is being eliminated, the energy assembly 113 also releases the energy to extend toward two ends, and pushes the linking assembly 112 to move toward the driving assembly 110. While the linking assembly 112 is moved toward the driving assembly 110, the linking assembly 112 may drive the rotating assembly 111 to retract through the pushing unit 1120, so that the wheel member 103 is in the flattened state (see FIG. 4).

In a preferable embodiment, when the wheel member 103 is deployed in the standing state, a predetermined angle A is formed between the wheel member 103 and the support shaft 100. The predetermined angle A is selected from 85 to 95 degrees and preferably can be 90 degree.

Correspondingly, when the wheel member 103 is in the flattened state, the wheel member 103 is substantially parallel to the support shaft 100.

In another preferable embodiment, the rotating assembly 111 may further comprise a fixing unit 1111 and a movable unit 1112. The fixing unit 1111 is disposed in correspondence with the one end of the support shaft 100. The linking assembly 112 is disposed between the driving assembly 100 and said one end of the fixing unit 1111. One end of the movable unit 1112 is connected to the fixing unit 1111, and the other end of the movable unit 1112 is connected to the wheel member 103. Said one end of the pushing unit 1120 is pivotally connected to the movable unit 1112.

For example, the rotating assembly 111 of the disclosure may further include a fixing unit 1111 and a movable unit 1112. The fixing unit 1111 may be a fixing plug disposed on one end of the support shaft 100, and the movable unit 1112 may be a metallic supporting member. One end of the movable unit 1112 is pivotally connected to the fixing unit 1111, one side of the movable unit 1112 is pivotally connected to one end of the pushing unit 1120, and the other side of the movable unit 1112 is pivotally connected to the wheel member 103.

Furthermore, when the driving assembly 110 is driven to move the linking assembly 112 to approach the fixing unit 1111, the linking assembly 112 drives the movable unit 1112 to rotate in a first direction F1 through the pushing unit 1120, so that the rotating assembly 111 is deployed. That is, when the driving assembly 110 drives the linking assembly 112 to approach the fixing unit 1111, the linking assembly 112 drives, through the pushing unit 1120, the movable unit 1112 to rotate in the first direction F1 with the fixing unit 1111 serving as a fulcrum, and then to be deployed, so that the wheel member 103 enters the standing state.

Correspondingly, when the energy assembly 113 pushes the linking assembly 112 to move toward the driving assembly 110, the linking assembly 112 drives the movable unit 1112 to rotate in a second direction F2 through the pushing unit 1120, so that the rotating assembly 111 is retracted. That is, when the wheel member 103 stops exerting the pulling force onto the linking assembly 112 to make the linking assembly 112 stop pushing the energy assembly 113, and the energy assembly 113 releases the energy to extend toward two ends, and pushes the linking assembly 112 to move toward the driving assembly 110. At this time, while the linking assembly 112 is moved toward the driving assembly 110, the linking assembly 112 can drive, through the pushing unit 1120, the movable unit 1112 to rotate in the second direction F2 with the fixing unit 1111 serving as a fulcrum, and then to be retracted, so that the wheel member 103 enters the flattened state.

As mentioned hereinabove, the first direction F1 and the second direction F2 are opposite directions. That is, when the first direction F1 is clockwise, the second direction F2 is counterclockwise. However, the disclosure is not restricted thereto.

Figure 5:
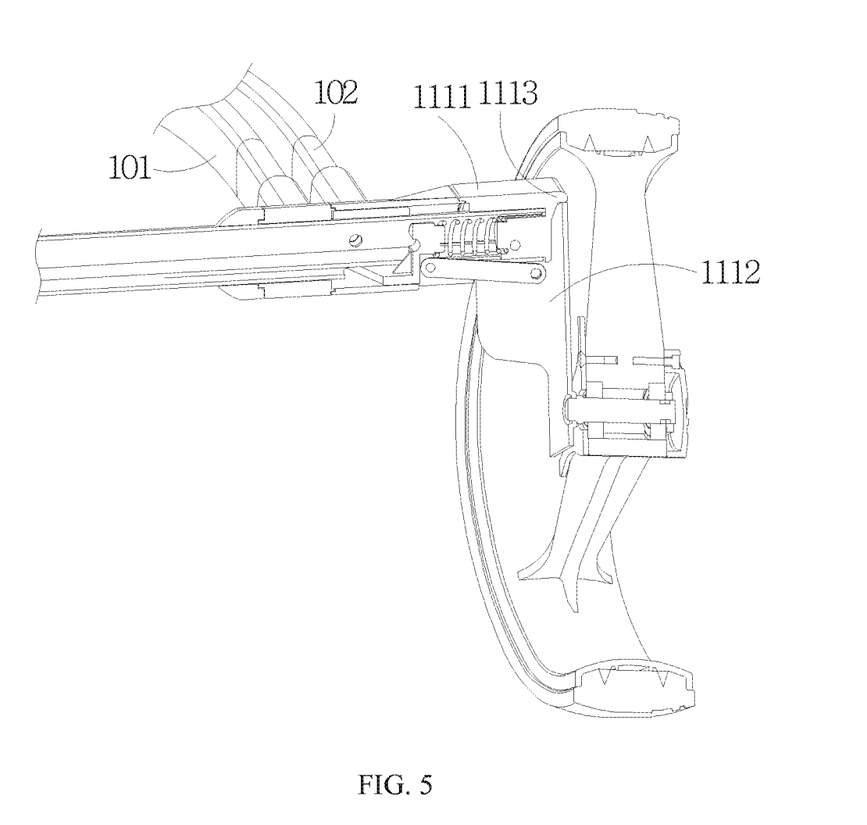
FIG. 5 is a schematic structure view showing a cart according to a second embodiment of the disclosure.

FIG. 5 is a schematic structure view showing a cart according to a second embodiment of the disclosure. Referring to FIG. 5 in conjunction with FIGS. 1 to 4, the same elements in the cart of this embodiment and the cart of the first embodiment have similar operations, so detailed descriptions thereof will be omitted. In this embodiment, however, it is worth mentioning that one end of the fixing unit 1111 is disposed in correspondence with one end of the support shaft 100, the other end of the fixing unit 1111 is pivotally connected to one end of the movable unit 1112, and the other end of the fixing unit 1111 further comprises a salient 1113. Thus, after the movable unit 1112 is rotated in the first direction F1 to finish the deploying operation, one end of the movable unit 1112 may push against the salient 1113 to achieve the positioning and limiting effects.

It is worth mentioning that the structure of the portion of the salient 1113 on the fixing unit 1111 may also be implemented by way of filleting, and is not restricted to the above-mentioned embodiment.

Figure 6:
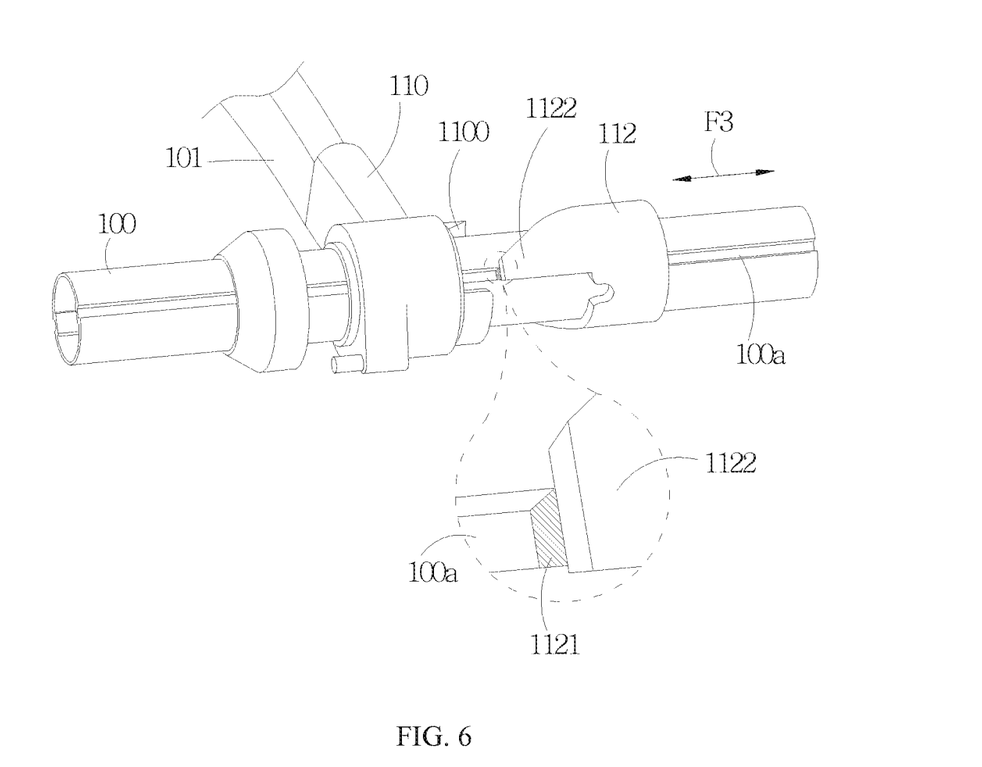
FIG. 6 is a schematic structure view showing a cart according to a third embodiment of the disclosure.

Please refer to FIG. 6, which is a schematic structure view showing a cart according to a third embodiment of the disclosure, and please also refer to FIGS. 1 to 5. As shown in the drawings, the cart of this embodiment has a configuration and an action mode similar to the carts depicted in the abovementioned embodiments. Therefore, the details are omitted here. However, it is noteworthy that, in this embodiment, the linking assembly 112 may be preferably a hollow structure, wherein the linking assembly 112 comprises at least one projecting portion 1121, which snaps into a sliding slot 100a of the support shaft 100.

Specifically speaking, the linking assembly 112 of the disclosure may be preferably an annular hollow structure. Thus, an inner wall surface of the linking assembly 112 comprises at least one projecting portion 1121. When the linking assembly 112 is fitted with the support shaft 100, at least one projecting portion 1121 may snap into the sliding slot 100a of the support shaft 100. When the linking assembly 112 is moved, the at least one projecting portion 1121 may slide in the sliding slot 100a to achieve the movement in the linear direction F3.

Moreover, one end of the driving assembly 110 may comprise at least one pushing portion 1100. One end of the linking assembly 112 corresponding to the at least one pushing portion 1100 comprises a resisting portion 1122. When the driving assembly 110 pushes the resisting portion 1122 through the at least one pushing portion 1100 to move the linking assembly 112 toward the rotating assembly 111, the linking assembly 112 moves in the sliding slot 100a through the at least one projecting portion 1121.

In other words, one end of the driving assembly 110 of the disclosure may further comprise at least one pushing portion 1100, which may be a helical bevel structure. The linking assembly 112 may also have a resisting portion 1122 corresponding to the at least one pushing portion 1100, wherein the resisting portion 1122 may be similarly a helical bevel structure. Thus, when the driving assembly 110 is driven to rotate, the driving assembly 110 may push the resisting portion 1122 to rotate through the at least one pushing portion 1100, so that the linking assembly 112 is moved toward the fixing unit 1111 of the rotating assembly 111. Meanwhile, the linking assembly 112 may also slide in the sliding slot 100a through the at least one projecting portion 1121, and approach the fixing unit 1111 in a straight line movement manner on the support shaft 100.

Figure 7:
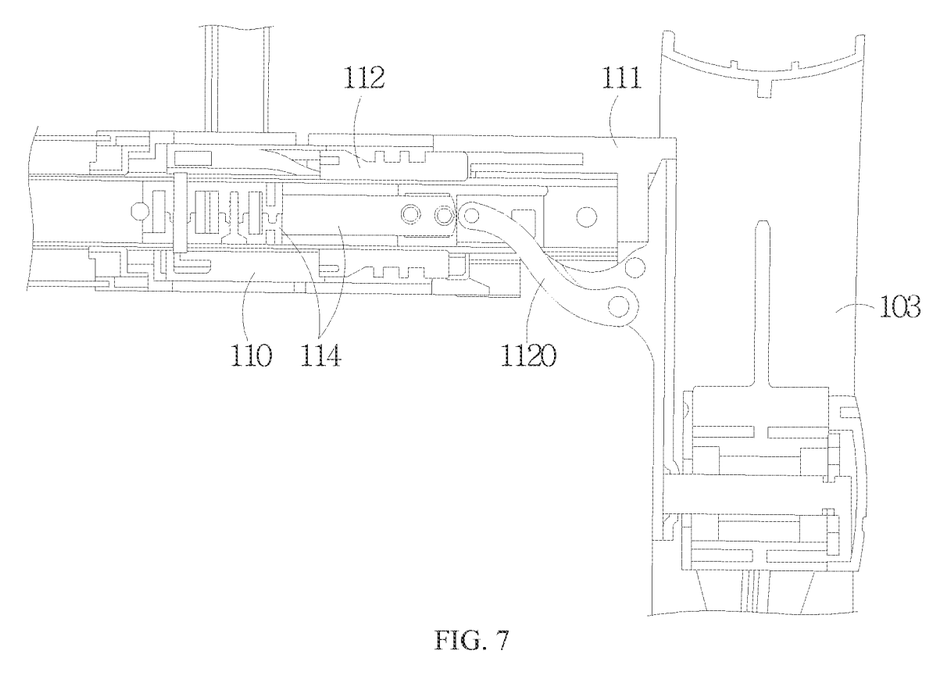
FIG. 7 is a first schematic structure view showing a cart according to a fourth embodiment of the disclosure.
Figure 8:
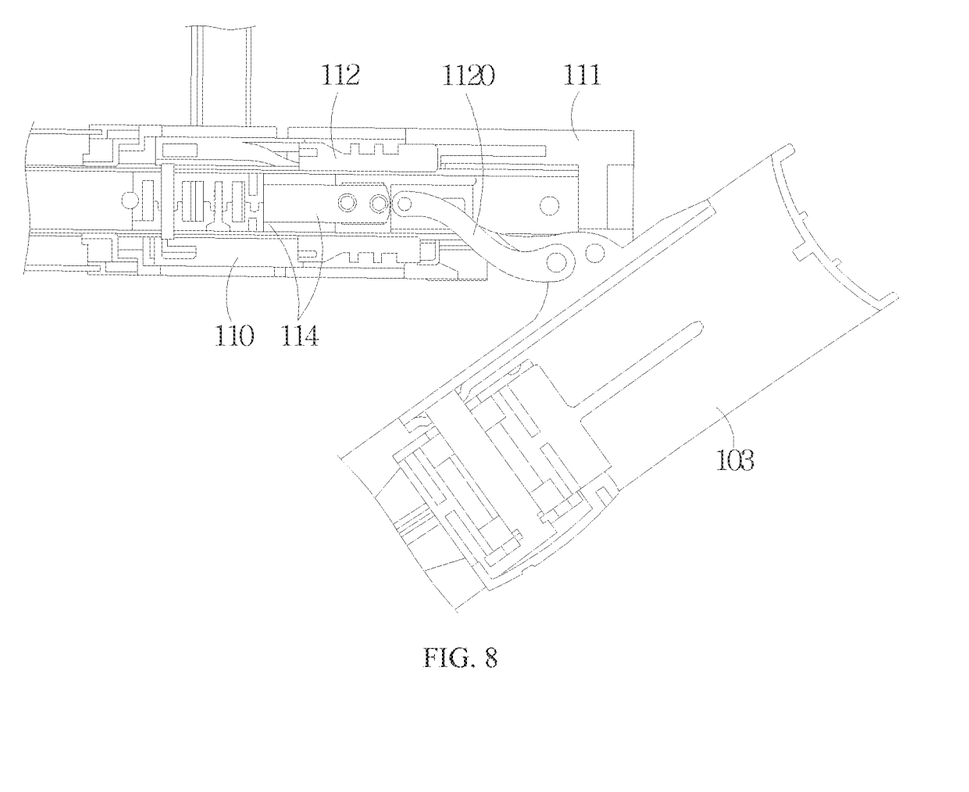
FIG. 8 is a second schematic structure view showing the cart according to the fourth embodiment of the disclosure.
Figure 9:
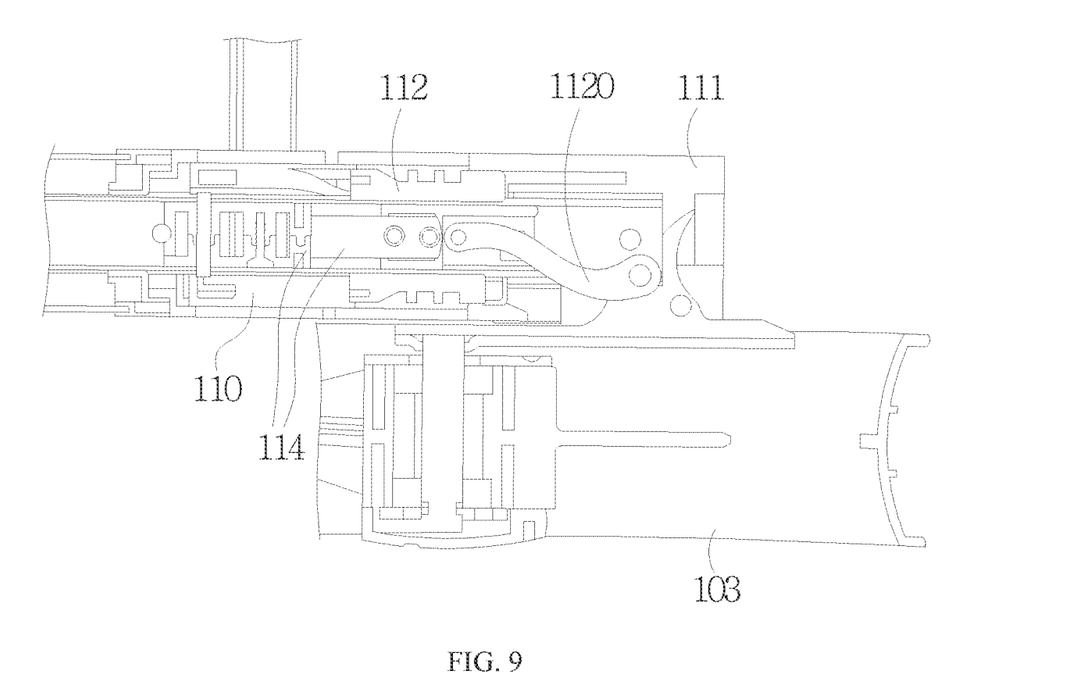
FIG. 9 is a third schematic structure view showing the cart according to the fourth embodiment of the disclosure.

FIGS. 7 to 9 are first, second and third schematic structure views respectively showing a cart according to a fourth embodiment of the disclosure. Referring to FIGS. 7 to 9 in conjunction with FIGS. 1 to 6, the same elements in the cart of this embodiment and the cart of each embodiment have similar operations, structures and achievable technological effects, so detailed descriptions thereof will be omitted. However, it is worth mentioning that when the driving assembly 110 is driven to move the linking assembly 112 toward the rotating assembly 111, the linking assembly 112 drives the rotating assembly 111 to be deployed through the pushing unit 1120, so that the wheel member 103 is deployed in the standing state and links with the energy assembly 114 to stretch. When the linking assembly 112 has not yet linked with the energy assembly 114 and the energy assembly 114 winds through the self-retraction force, the energy assembly 114 drives the linking assembly 112 to move toward the driving assembly 110, so that the linking assembly 112 drives the rotating assembly 111 to be retracted through the pushing unit 1120 to make the wheel member 103 enter the flattened state.

Specifically speaking, the energy assembly 114 of the cart 1 of this embodiment may be a constant force spring, wherein the energy assembly 114 is fixedly disposed in the support shaft 20 and is disposed adjacent to (abuts upon) the driving assembly 110. In addition, the linking assembly 112 further comprises the pushing unit 1120, wherein one end of the pushing unit 1120 is pivotally connected to one side of the rotating assembly 111. Thus, when the user wants to use the vehicle 2, the user may directly or indirectly drive the driving assembly 110 (e.g., drive the driving assembly 110 through the first frame member 101) to move the linking assembly 112 to approach the rotating assembly 111. While the linking assembly 112 is operating, the linking assembly 112 may also drive the rotating assembly 111 to be deployed through the pushing unit 1120, so that the wheel member 103 is deployed in the standing state (see FIG. 7), and the vehicle 2 can be operated by the user. While the driving assembly 110 moves the linking assembly 112 to approach the rotating assembly 111, the linking assembly 112 also pulls the energy assembly 114 to link with the energy assembly 114 to stretch. Because the friction is present when the wheel member 103 touches the ground or the object, the wheel member 103 may exert a pulling force onto the linking assembly 112 through the rotating assembly 111, so that the linking assembly 112 pulls the energy assembly 114.

Figure 1:
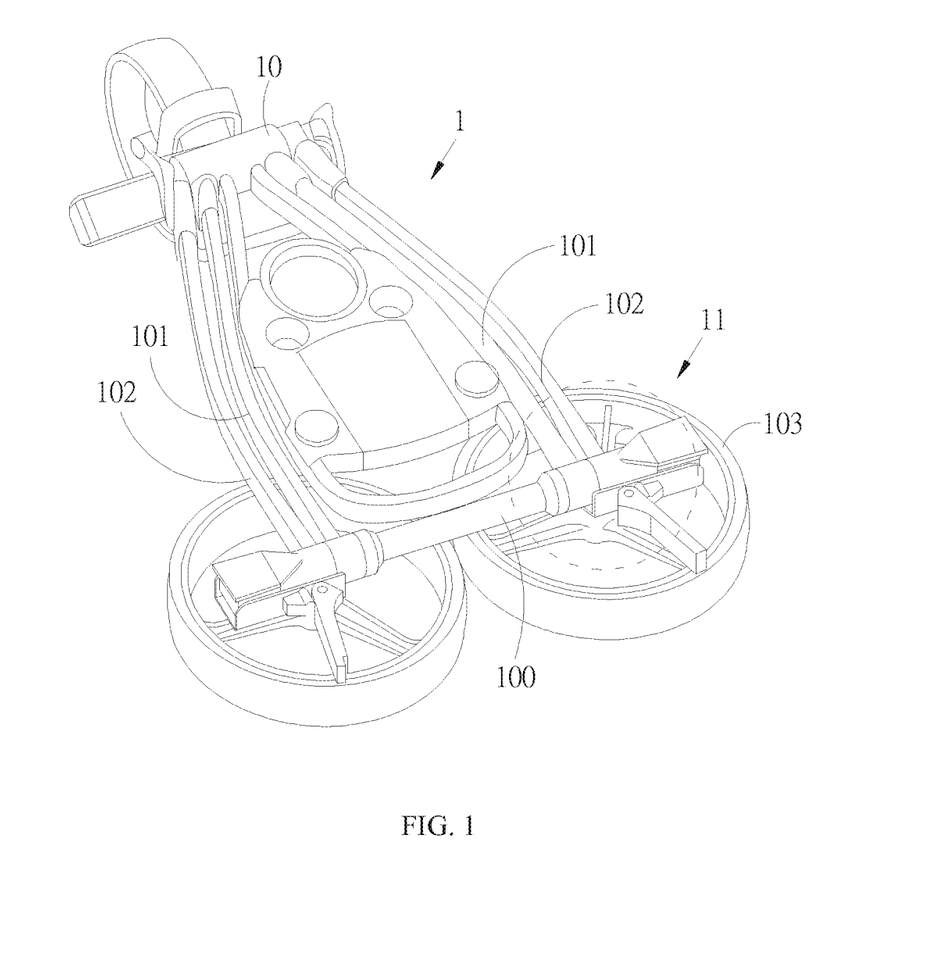
FIG. 1 is a first schematic structure view showing a cart according to a first embodiment of the disclosure.
Figure 2:
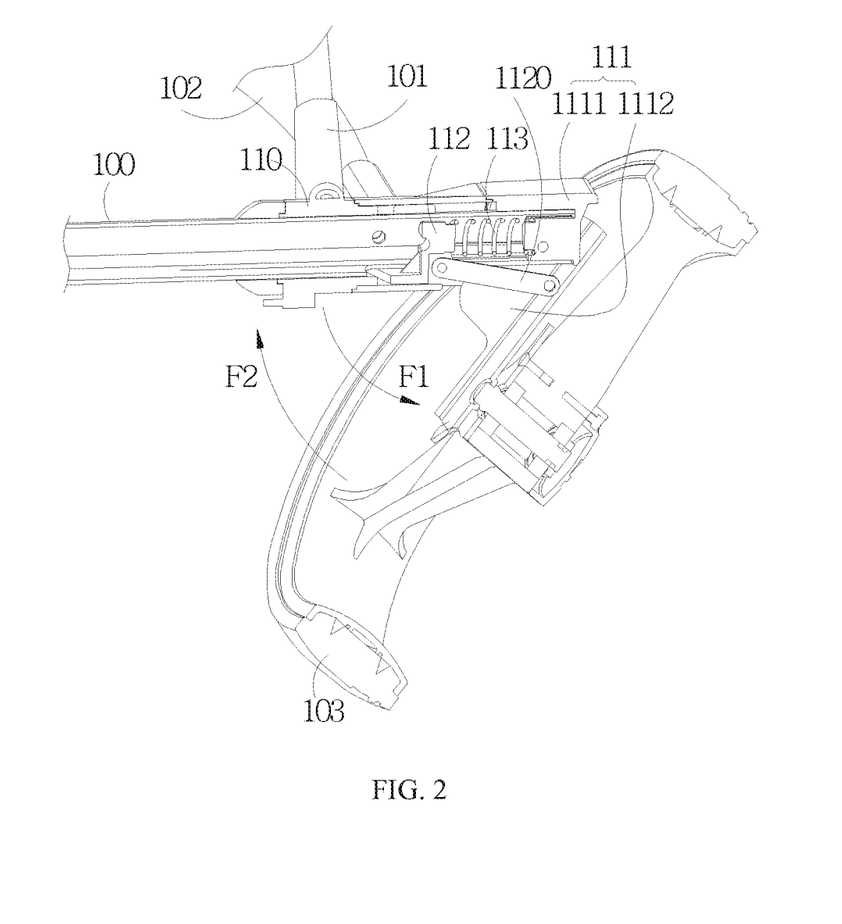
FIG. 2 is a second schematic structure view showing the cart according to the first embodiment of the disclosure.
Figure 3:
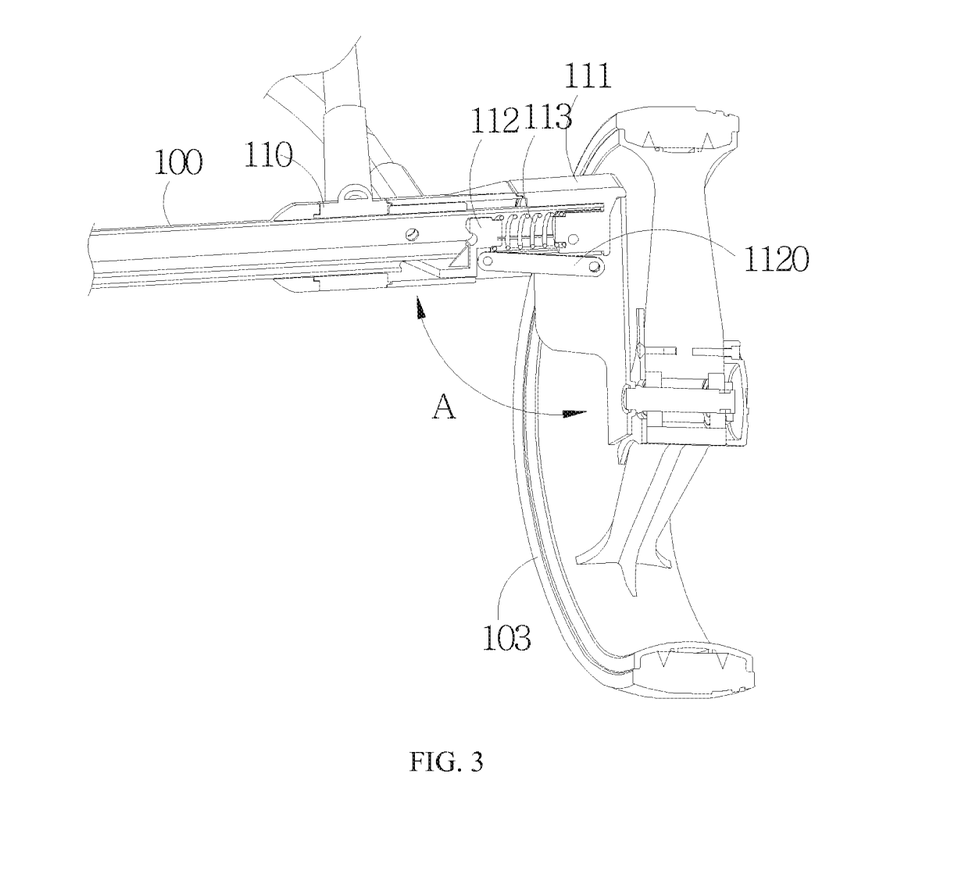
FIG. 3 is a third schematic structure view showing the cart according to the first embodiment of the disclosure.
Figure 4:
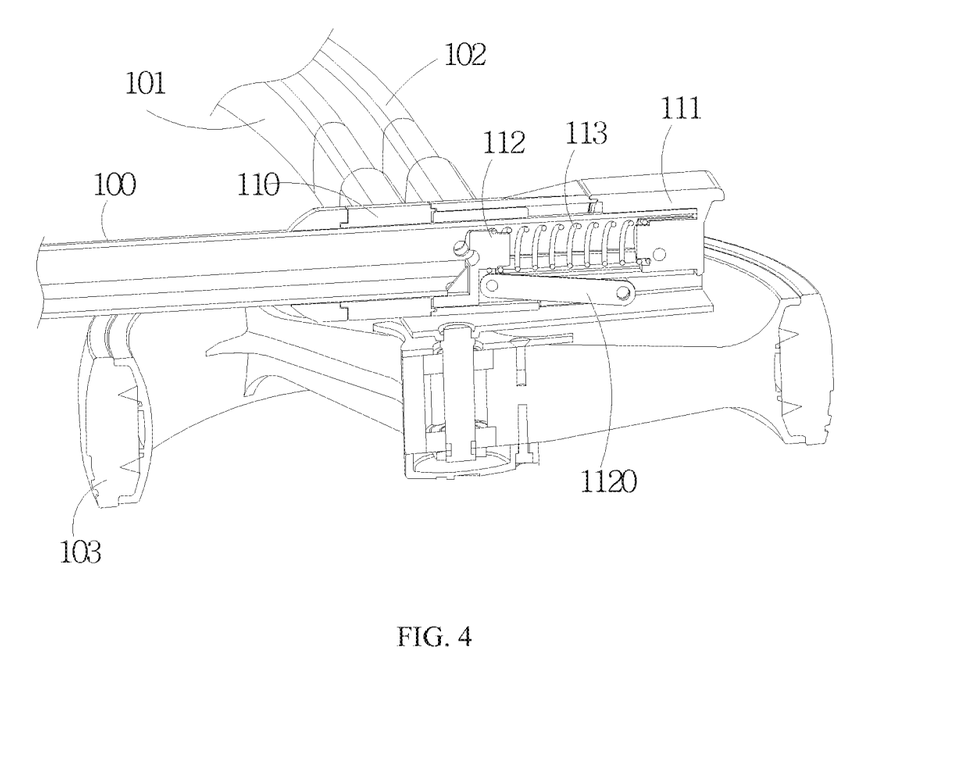
FIG. 4 is a fourth schematic structure view showing the cart according to the first embodiment of the disclosure.

When the user wants to store the vehicle 2 (the cart 1 as shown in FIG. 1), the user can firstly retract or fold the first frame member 101 to move the driving assembly 110 away from the linking assembly 112 without pushing the linking assembly 112. Next, the wheel member 103 is suspended. While the friction between the wheel member 103 and the ground or the object is being eliminated, the wheel member 103 also stops the pulling force exerted onto the linking assembly 112, so that the linking assembly 112 also stops the pulling force from being exerting onto the energy assembly 114. At this time, the energy assembly 114 winds through the self-retraction force, and also moves the linking assembly toward the driving assembly. In addition, while the linking assembly 112 is moved toward the driving assembly 110, the linking assembly 112 may drive the rotating assembly 111 to be retracted through the pushing unit 1120, so that the wheel member 103 is in the flattened state (see FIG. 9).

It is worth noting that a larger force must be exerted with the spring deformation when the ordinary linear spring is being compressed (i.e., the wheels of the vehicle and the cart are being deployed). Thus, the user may feel uncomfortable and not easy upon operating. On the contrary, the power of the constant force spring is more uniform upon stretching and winding, so that the user may feel comfortable and easy upon operating. Thus, the constant force spring is used as the energy assembly 114 in the cart 1 of this embodiment.

Figure 10:
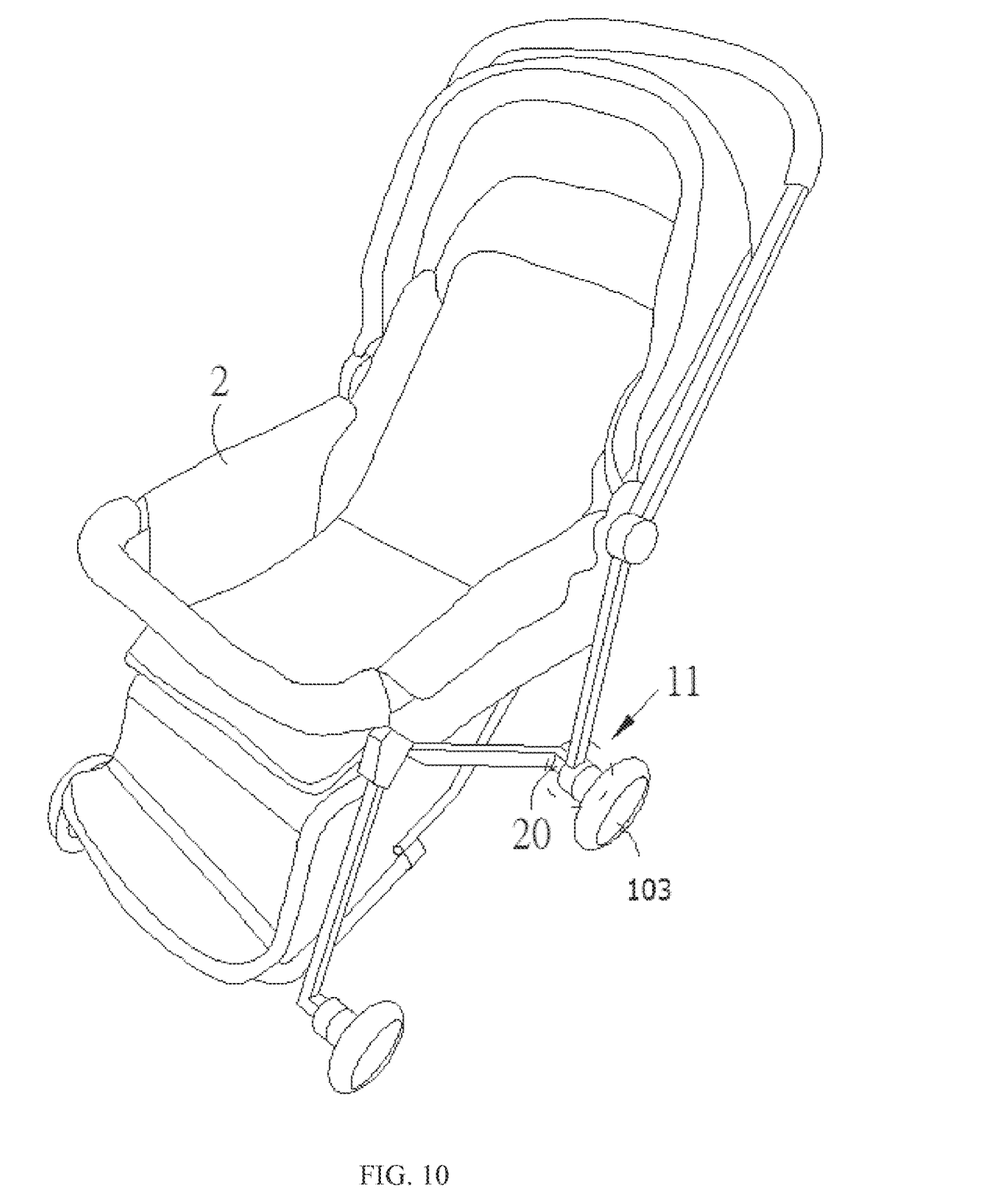
FIG. 10 is a schematic structure view showing a wheel connecting structure according to an embodiment of the disclosure.

Please refer to FIG. 10, which is a schematic structure view showing a wheel connecting structure according to an embodiment of the disclosure, and please also refer to FIGS. 1 to 9. As shown in the drawings, the wheel connecting structure of this embodiment has a configuration and an action mode similar to the wheel connecting structures of the carts depicted in the abovementioned embodiments. In other words, the wheel connecting structure 11 of the present embodiment comprises a driving assembly 110, a rotating assembly 111, a linking assembly 112 and an energy assembly 113. The driving assembly 110 is fitted with (or telescoped with, as mentioned above) a support shaft 20 of a vehicle 2. One end of the rotating assembly 111 disposed in correspondence with one end of the support shaft 100, and the other end of the rotating assembly 111 is pivotally mounted on a wheel member 103. The linking assembly 112 is fitted with the support shaft 100, and disposed between the driving assembly 110 and the one end of the rotating assembly 111. The linking assembly 112 comprises a pushing unit 1120, and one end of the pushing unit 1120 is pivotally connected to the rotating assembly 111. The energy assembly 113 is disposed in the support shaft 100 and connected to the linking assembly 112.

In one implementation aspect, when the driving assembly 110 is driven to move the linking assembly 112 to approach the rotating assembly 111, the linking assembly 112 drives the rotating assembly 111 to be deployed through the pushing unit 1120, so that the wheel member 103 is deployed in the standing state, and pushes the energy assembly 113 to enter the energy storing state. Correspondingly, when the linking assembly 112 has not pushed the energy assembly 113 and the energy assembly 113 is in the energy releasing state, the energy assembly 113 pushes the linking assembly 112 to move toward the driving assembly 110, so that the linking assembly 112 drives the rotating assembly 111 to be retracted through the pushing unit 1120, and the wheel member 103 enters the flattened state.

Specifically speaking, the wheel connecting structure 11 of the disclosure has the function of making the wheel be automatically flattened and retracted to provide the user the storage convenience. The wheel connecting structure 11 of the disclosure may be applied to the vehicle 2, such as various carts including vegetable carts, baby carts and the like. In this embodiment, the vehicle 2 is a baby cart serving as an example, but the disclosure is not restricted thereto. The wheel connecting structure 11 includes the driving assembly 110, the rotating assembly 111, the linking assembly 112 and the energy assembly 113. The driving assembly 110 and the linking assembly 112 may be hollow structures respectively fitted with the support shaft 100 of the vehicle 2 and abut upon each other. One end of the rotating assembly 111 may be disposed on one end of the support shaft 100, and the other end of the rotating assembly 111 comprises the wheel member 103. The linking assembly 112 is further connected to the energy assembly 113, wherein the energy assembly 113 may be a spring, an oil cylinder or a constant force spring. The energy assembly 113 may be disposed between the linking assembly 112 and the driving assembly 110, or between the linking assembly 112 and the rotating assembly 111. In addition, the linking assembly 112 further comprises the pushing unit 1120, and one end of the pushing unit 1120 is pivotally connected to one side of the rotating assembly 111.

Thus, when the user wants to use the vehicle 2 in this implementation aspect, the user may directly or indirectly drive the driving assembly 110 to move the linking assembly 112 to approach the rotating assembly 111. While the linking assembly 112 is operating, the linking assembly 112 also drives the rotating assembly 111 to be deployed through the pushing unit 1120, so that the wheel member 114 is deployed in the standing state (see FIG. 3), and the vehicle 2 can handle the article through the wheel member 103. In addition, when the driving assembly 110 moves the linking assembly 112 toward the rotating assembly 111, the linking assembly 112 pushes the energy assembly 113 to make the energy assembly 113 enter the energy storing state to store the energy. The friction is present while the wheel member 114 touches the ground or the object, so that the wheel member 103 may exert a pulling force onto the linking assembly 112 through the rotating assembly 111, and the linking assembly 112 continuously pushes the energy assembly 113.

When the user wants to store the vehicle 2, the user can firstly fold and retract the frame to drive the driving assembly 110 to move away from the linking assembly 112 without pushing the linking assembly 112. Next, the wheel member 114 is suspended. While the friction between the wheel member 103 and the ground or the object is being eliminated, the wheel member 103 also stops exerting a pulling force onto the linking assembly 112. At this time, the linking assembly 112 stops pushing the energy assembly 113, so that the energy assembly 113 releases the energy to extend toward two ends and pushes the linking assembly 112 to move toward the driving assembly 110. While the linking assembly 112 is moved toward the driving assembly 110, the linking assembly 112 may drive the rotating assembly 111 to be retracted through the pushing unit 1120 to make the wheel member 103 enter the flattened state (see FIG. 4).

In another implementation aspect, when the driving assembly 110 is driven to move the linking assembly 112 toward the rotating assembly 111, the linking assembly 112 drives the rotating assembly 111 to be deployed through the pushing unit 1120, so that the wheel member 103 is deployed in the standing state and links with the energy assembly 114 to stretch. When the linking assembly 112 has not yet linked with the energy assembly 114 and the energy assembly 114 winds through the self-retraction force, the energy assembly 114 drives the linking assembly 112 to move toward the driving assembly 110, so that the linking assembly 112 drives the rotating assembly 111 to be retracted through the pushing unit 1120 to make the wheel member 103 enter the flattened state.

For example, when the user wants to use the vehicle 2, the user may directly or indirectly drive the driving assembly 110 (e.g., drive the driving assembly 110 through the first frame member 101) to move the linking assembly 112 to approach the rotating assembly 111. While the linking assembly 112 is operating, the linking assembly 112 may also drive the rotating assembly 111 to be deployed through the pushing unit 1120, so that the wheel member 103 is deployed in the standing state (see FIG. 7), and the vehicle 2 can be operated by the user. While the driving assembly 110 moves the linking assembly 112 to approach the rotating assembly 111, the linking assembly 112 also pulls the energy assembly 114 to link with the energy assembly 114 to stretch. Because the friction is present when the wheel member 103 touches the ground or the object, the wheel member 103 may exert a pulling force onto the linking assembly 112 through the rotating assembly 111, so that the linking assembly 112 pulls the energy assembly 114.

When the user wants to store the vehicle 2 (the cart 1 as shown in FIG. 1), the user can firstly retract or fold the first frame member 101 to move the driving assembly 110 away from the linking assembly 112 without pushing the linking assembly 112. Next, the wheel member 103 is suspended. While the friction between the wheel member 103 and the ground or the object is being eliminated, the wheel member 103 also stops the pulling force exerted onto the linking assembly 112, so that the linking assembly 112 also stops the pulling force from being exerting onto the energy assembly 114. At this time, the energy assembly 114 winds through the self-retraction force, and also moves the linking assembly toward the driving assembly. In addition, while the linking assembly 112 is moved toward the driving assembly 110, the linking assembly 112 may drive the rotating assembly 111 to be retracted through the pushing unit 1120, so that the wheel member 103 is in the flattened state (see FIG. 9).

It is worth noting that a larger force must be exerted with the spring deformation when the ordinary linear spring is being compressed (i.e., the wheels of the vehicle and the cart are being deployed). Thus, the user may feel uncomfortable and not easy upon operating. On the contrary, the power of the constant force spring is more uniform upon stretching and winding, so that the user may feel comfortable and easy upon operating. Thus, the constant force spring is used as the energy assembly 114 in the cart 1 of this embodiment.

It is worth mentioning that the implementation aspects of the structures and operations of the wheel connecting structure 11 of the disclosure and the wheel connecting structure 11 of the cart 1 in each embodiment are the same, so detailed descriptions thereof will be omitted.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

The invention claimed is:

1. A cart, comprising:
    a body structure comprising a support shaft, a first frame member and a second frame member, wherein both of the first frame member and the second frame member are disposed on the support shaft; and
    at least one wheel connecting structure, which is disposed on one end of the support shaft and comprises:
        a driving assembly fitted with the support shaft and connected to the first frame member;
        a rotating assembly, wherein one end of the rotating assembly is disposed in correspondence with the one end of the support shaft, and an other end of the rotating assembly is pivotally mounted on a wheel member;
        a linking assembly fitted with the support shaft, and disposed between the driving assembly and the one end of the rotating assembly, wherein the linking assembly comprises a pushing unit, and one end of the pushing unit is pivotally connected to the rotating assembly; and
        an energy assembly disposed in the support shaft and connected to the linking assembly.

2. The cart according to claim 1, wherein when the first frame member is driven and links with the driving assembly to move the linking assembly to approach the rotating assembly, the linking assembly moves the rotating assembly to be deployed through the pushing unit, so that the wheel member is deployed in a standing state, and pushes the energy assembly to make the energy assembly enter an energy storing state.

3. The cart according to claim 1, wherein when the first frame member is driven to disengage the driving assembly from the linking assembly, and the wheel member does not contact a ground, the energy assembly is in an energy releasing state to push the linking assembly toward the driving assembly, so that the linking assembly drives the rotating assembly to be retracted through the pushing unit to make the wheel member enter a flattened state.

4. The cart according to claim 1, wherein the rotating assembly further comprises:
    a fixing unit disposed in correspondence with the one end of the support shaft, wherein the linking assembly is disposed between the driving assembly and the fixing unit; and
    a movable unit, wherein one end of the movable unit is connected to the fixing unit, an other end of the movable unit is connected to the wheel member, wherein the one end of the pushing unit is pivotally connected to the movable unit.

5. The cart according to claim 1, wherein when the wheel member is deployed in the standing state, a predetermined angle is formed between the wheel member and the support shaft, and the predetermined angle ranges from 85 to 95 degrees.

6. The cart according to claim 1, wherein the linking assembly comprises a hollow structure, an inner wall of the linking assembly comprises at least one projecting portion, and the at least one projecting portion snaps in a sliding slot of the support shaft.

7. The cart according to claim 6, wherein one end of the driving assembly comprises at least one pushing portion, one end of the linking assembly facing the at least one pushing portion comprises a resisting portion, and when the driving assembly pushes the resisting portion through the at least one pushing portion to move the linking assembly toward the rotating assembly, the linking assembly moves in the sliding slot through the at least one projecting portion.

8. The cart according to claim 1, wherein when the driving assembly is driven to move the linking assembly to approach the rotating assembly, the linking assembly moves the rotating assembly to be deployed through the pushing unit, so that the wheel member is deployed in a standing state, and links with the energy assembly to stretch.

9. The cart according to claim 8, wherein when the energy assembly winds through a self-retraction force, the energy assembly moves the linking assembly toward the driving assembly, so that the linking assembly drives the rotating assembly to be retracted through the pushing unit to make the wheel member enter a flattened state.

10. The cart according to claim 8, wherein the rotating assembly further comprises:
a fixing unit disposed in correspondence with the one end of the support shaft, wherein the linking assembly is disposed between the driving assembly and the fixing unit; and
a movable unit, wherein one end of the movable unit is connected to the fixing unit, and an other end of the movable unit is connected to the wheel member, wherein the one end of the pushing unit is pivotally connected to the movable unit.

11. The cart according to claim 8, wherein when the driving assembly is driven to move the linking assembly to approach the fixing unit, the linking assembly rotates the movable unit in a first direction through the pushing unit, so that the rotating assembly is deployed.

12. The cart according to claim 8, wherein when the energy assembly moves the linking assembly toward the driving assembly, the linking assembly rotates the movable unit in a second direction through the pushing unit, so that the rotating assembly is retracted.

13. The cart according to claim 8, wherein when the wheel member is deployed in the standing state, a predetermined angle is formed between the wheel member and the support shaft, and the predetermined angle ranges from 85 to 95 degrees.

14. A wheel connecting structure, comprising:
a driving assembly fitted with a support shaft of a vehicle;
a rotating assembly, wherein one end of the rotating assembly is disposed in correspondence with one end of the support shaft, and an other end of the rotating assembly is pivotally mounted on a wheel member;
a linking assembly fitted with the support shaft, and disposed between the driving assembly and the one end of the rotating assembly, wherein the linking assembly comprises a pushing unit, and one end of the pushing unit is pivotally connected to the rotating assembly; and
an energy assembly disposed in the support shaft and connected to the linking assembly,
wherein when the wheel member is deployed in the standing state, a predetermined angle is formed between the wheel member and the support shaft, and the predetermined angle ranges from 85 to 95 degrees.

15. The wheel connecting structure according to claim 14, wherein the rotating assembly further comprises:
a fixing unit disposed in correspondence with the one end of the support shaft, wherein the linking assembly is disposed between the driving assembly and the fixing unit; and
a movable unit, wherein one end of the movable unit is connected to the fixing unit, an other end of the movable unit is connected to the wheel member, wherein the one end of the pushing unit is pivotally connected to the movable unit.

16. The wheel connecting structure according to claim 14, wherein the linking assembly comprises a hollow structure, an inner wall of the linking assembly comprises at least one projecting portion, and the at least one projecting portion snaps in a sliding slot of the support shaft.

17. The wheel connecting structure according to claim 16, wherein one end of the driving assembly comprises at least one pushing portion, one end of the linking assembly facing the at least one pushing portion comprises a resisting portion, and when the driving assembly pushes the resisting portion through the at least one pushing portion to move the linking assembly toward the rotating assembly, the linking assembly moves in the sliding slot through the at least one projecting portion.

18. The wheel connecting structure according to claim 14, wherein when the driving assembly is driven to move the linking assembly to approach the rotating assembly, the linking assembly moves the rotating assembly to be deployed through the pushing unit, so that the wheel member is deployed in a standing state, and links with the energy assembly to stretch.

19. The wheel connecting structure according to claim 18, wherein when the energy assembly winds through a self-retraction force, the energy assembly moves the linking assembly toward the driving assembly, so that the linking assembly drives the rotating assembly to be retracted through the pushing unit to make the wheel member enter a flattened state.

* * * * *